Patented Feb. 16, 1937

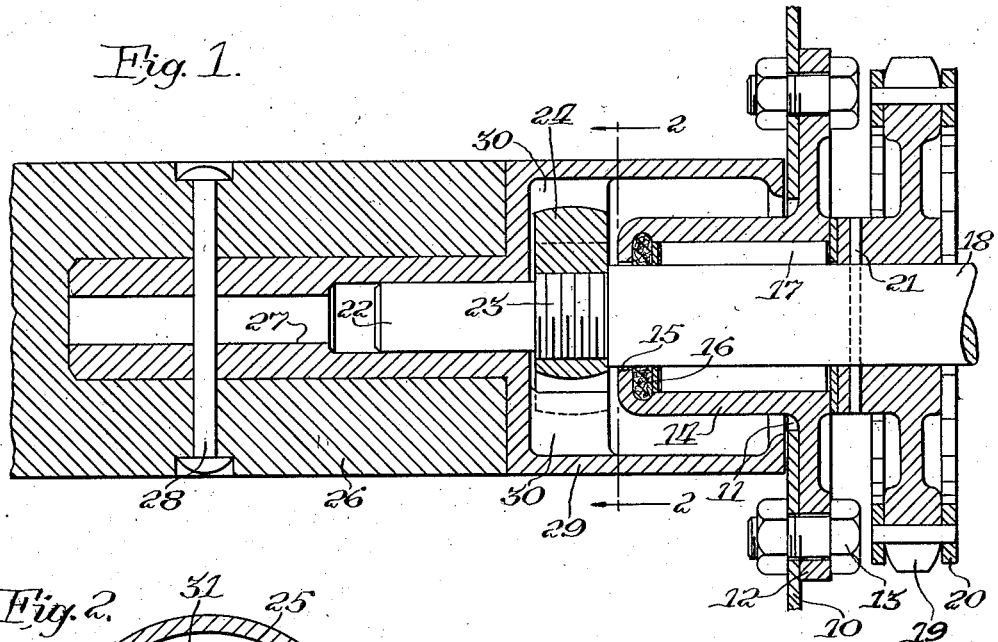
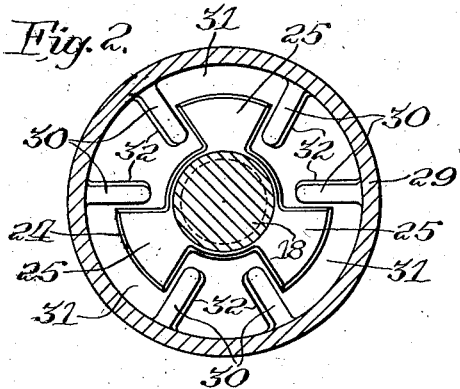
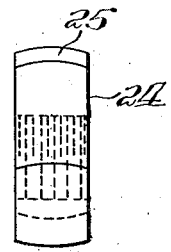
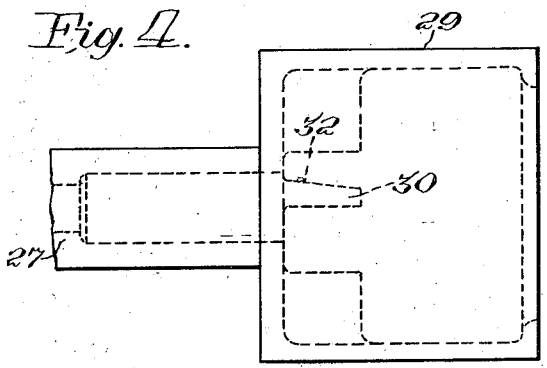
Inventors
Charles F. Crumb
and Gustaf Hammer
By V. F. Laraque
Atty.

2,071,114

UNITED STATES PATENT OFFICE 2,071,114

ELEVATOR ROLLER DRIVE COUPLING

Charles F. Crumb and Gustaf Hammer, Chicago, Ill., assignors to International Harvester Company, a corporation of New Jersey Application October 21, 1935, Serial No. 45,990

8 Claims. (Cl. 198—203)

The invention relates to a roller shaft mounting and drive coupling designed especially for use in mounting and driving an elevator roller employed in grain binders, and the like.

It is desirable that such shaft coupling be simple, sturdy and effective for its purpose; also that it permit of quick mounting and dismounting of the roller relative to the drive shaft. It is also important that the drive coupling unit for the roller be manufactured and assembled as a unit with a gear box to be mounted on the grain binder elevator frame so that when the roller and coupling are drivingly associated they will be accurately aligned.

The primary object of the invention is to provide an improved mounting for an elevator roller, or the like.

Another object is to provide an improved dedetachable drive coupling for the roller.

Still another object is to provide a mounting forming a unit with a gear box so that when the latter is positioned on a grain binder elevator frame, the drive shaft and coupling will without further effort be in proper alignment to receive the roller for mounting and driving the same.

Other important objects will be apparent to those skilled in this art as the disclosure is more fully made.

These important objects may be achieved briefly by the practicable example of the invention herein shown and described, in which form, a gear box is provided, said box to be mounted on an elevator, or the like, frame. This box carries a bearing carrier extending through an opening in the box, said carrier serving to mount an antifriction bearing for journaling a drive shaft that extends from within the box, through the carrier, to leave an exposed protruding end of the shaft. Mounted on the protruding end of the drive shaft is made fast a driving element having a number of radial driving lugs or bosses in angularly spaced relationship. The elevator roller is made of wood, or other material and has fitted axially into one end thereof a gudgeon including an enlarged cup-shaped sleeve of the same size as the roller. Said sleeve is formed with radially disposed spaced pairs of lugs or vanes. When this sleeve end of the roller is inserted over the protruded end of the drive shaft, these pairs of vanes slidably fit over and interlock with the lugs or bosses on the shaft driver to form a dog clutch drive coupling. So much will suffice for the present in giving a general understanding of the structure.

In the accompanying sheet of drawings:

Figure 1 is a central cross sectional view through one end of the roller and its coupling with the drive shaft;

Figure 2 is a cross sectional view through the dog clutch drive coupling, taken along the line 2—2 of Figure 1, looking in the direction of the arrows;

Figure 3 is an elevational view of the driver element, per se; and,

Figure 4 is a side elevational view of the gudgeon element, showing the enlarged sleeve, or cup-shaped end thereof.

In applying the improved roller shaft coupling to the drive shaft in a grain binder for example, there is illustrated a wall of a gear box 10 which in practice will be carried on an elevator frame, not shown. Said wall 10 is formed with an opening 11 and adjacent said opening the wall carries a bracket 12, fastened by bolts 13, the bracket including a cylindrical bearing box or sleeve extension 14 which projects through the opening 11 as shown.

The head end of the box 14 is open as at 15, said head carrying a seal packing 16. Inside the sleeve is a roller cage 17, providing an anti-friction bearing for journaling one end of a drive shaft 18. Said shaft 18 extends from within the box 10, where it carries a drive sprocket wheel 19, driven from a chain 20. The hub of the wheel 19 is made fast to the shaft by a pin 21. Said shaft 18 has a reduced extension 22 extending some distance beyond the head of the bearing box 14, as shown. A portion of this shaft extension 22 is threaded at 23 adjacent the head of the box 14. This threaded portion 23 has screwed fast thereto a driver element 24 including three angularly disposed, and equidistantly spaced, radial driving lugs or bosses 25. This driver is preferably formed as a forging and to facilitate its manufacture as such the faces of each lug or boss 25 are formed slightly rounded, as shown.

The roller shaft is shown at 26 the same formed preferably of wood, with one end thereof being hollowed out to receive a hollow gudgeon 27 that snugly fits over the shaft extension 22 in a telescoping manner. Said gudgeon is made fast to the roller by such means as a pin 28, for example. The end of this gudgeon is enlarged to form a cup or sleeve 29 of the same size as the roller 26 and adapted telescopically to fit over and enclose the bearing box 14. The inner periphery of the cup 29 is formed with three pairs of radial vanes 30 arranged in equidistantly spaced pairs, as shown in Figure 2, each pair 30 being of a width equal to the width of the driver 24. Each pair of vanes 30 forms a socket 31 into which will interlockingly and slidably fit a driving prong or lug 25 to form a dog clutch drive coupling between the roller 26 and drive shaft 18, as will now be obvious. Each vane 30 is thickened as at 32 on its back side better to withstand the driving force, to strengthen said vanes whether the direction of rotation be clockwise or counterclockwise. It can now be seen that when the cup end of the roller 26 is slipped endwise over the shaft extension 22 and driver 24 that a driving shaft coupling is instantly had.

As has been indicated, in practice the gear box 10 as a complete unit includes the bearing carrier 14, shaft 18 and driver 24, so that when this gear box unit 10 is mounted on the binder elevator frame a properly aligned shaft to receive the roller is immediately provided. This is an important advantage. The roller 26, of course, includes its cupped sleeve end 29 and by slipping the roller end over the driver a roller shaft mount and clutch drive coupling is at once established.

It can now be seen that the structure described readily achieves all of the desirable objects heretofore recited. It is the intention to cover all such changes and modifications as do not in material respects constitute departures from the spirit and scope of the invention.

What is claimed is:

1. The combination with a driving unit comprising a support carrying a bracket including a bearing box extending from the support through an opening formed therein and a drive shaft journaled in the box and extending therethrough, the extended end of the shaft carrying a driver element fast thereon, said element including driving lugs; of an elevator roller carrying at one end a gudgeon including an enlarged cup shaped end member substantially the same size as the roller, said cup shaped end member including means providing socket portions to receive the driving lugs of the driver element when said end member is slipped over the bearing box to mount the roller and establish a driving clutch connection with the drive shaft.

2. The combination with a driving unit comprising a wall carrying a bracket including a bearing box extending from the wall through an opening formed therein, an anti-friction bearing carried in the box and a drive shaft journaled in the bearing in the box and extending therethrough, the extended end of the shaft carrying a driver element fast thereon, said element including substantially equidistantly spaced radial driving lugs; of an elevator roller carrying at one end a gudgeon including an enlarged cup shaped end member substantially the same size as the roller, said cup shaped end member including radial vanes providing socket portions spaced to receive the driving element when said end member is slipped over the bearing box to mount the roller and establish a driving clutch connection with the drive shaft.

3. The combination with a driving unit comprising a gear box having a wall carrying a bracket including a bearing box extending from the wall through an opening formed therein and a drive shaft journaled in the box and extending therethrough, the extended end of the shaft carrying a pronged driver element fast thereon; of an elevator roller carrying at one end a gudgeon including an enlarged cup shaped end member substantially the same size as the roller, said cup shaped end member including means providing socket portions to receive the prongs of the driver element when said end member is slipped over the bearing box to mount the roller and establish a driving clutch connection with the drive shaft.

4. The combination with a driving unit comprising a wall carrying a bracket including a bearing box extending from the wall and a drive shaft journaled in the box and extending through the box and wall, the extended end of the shaft carrying a driver element fast thereon, said element including angularly spaced driving lugs; of an elevator roller carrying at one end a gudgeon including an enlarged cup shaped end member, said cup-shaped end member including vanes providing spaced socket portions to receive the driving lugs of the driver element when said end member is slipped over the bearing box to mount the roller and establish a driving clutch connection with the drive shaft.

5. The combination with a driving unit comprising a wall carrying a bracket including a bearing box extending from the wall and a drive shaft journaled in the box and extending therethrough, the extended end of the shaft carrying a driver element fast thereon, said element including driving lugs, of an elevator roller carrying at one end a gudgeon including an enlarged cup shaped end member, said cup shaped end member fitting telescopically over the bearing box and including vanes providing socket portions to receive the driving lugs of the driver element when said end member is slipped over the bearing box to mount the roller and establish a driving clutch connection with the drive shaft.

6. The combination with a driving unit comprising a wall carrying a bracket including a bearing box extending from the wall and a drive shaft journaled in the box and extending therethrough, the extended end of the shaft carrying a driver element fast thereon, said element including radially extending angularly spaced driving lugs; of an elevator roller carrying at one end a gudgeon including an enlarged cup shaped end member adapted to be slipped over said bearing box, said cup shaped end member including radially inwardly spaced pairs of vanes providing socket portions to receive the driving lugs of the driver element when said end member is slipped over the bearing box to mount the roller and establish a driving clutch connection with the drive shaft.

7. The combination with a gear box having a stationary wall carrying a bearing for a shaft extending from the wall and a pronged driver element detachably secured to the shaft adjacent the bearing; of a roller having a hollow end piece to fit over the bearing and shaft, said end piece including means forming sockets to receive the pronged driver element to form a roller mount and clutch driving connection.

8. The combination with a gear box having a stationary wall carrying a projected bearing for a driving shaft end extending from the wall; of a roller having a hollow end piece to fit over the projected bearing to enclose the same, and complementary interfitting clutch parts disposed respectively in the hollow end piece and on the shaft to establish a roller mount and driving connection therefor with the shaft end.

CHARLES F. CRUMB.
GUSTAF HAMMER.